US006938687B2

(12) United States Patent
Holl

(10) Patent No.: US 6,938,687 B2
(45) Date of Patent: Sep. 6, 2005

(54) APPARATUS FOR TRANSFER OF HEAT ENERGY BETWEEN A BODY SURFACE AND HEAT TRANSFER FLUID

(75) Inventor: Richard A. Holl, Camarillo, CA (US)

(73) Assignee: Holl Technologies Company, Camarillo, CA (US)

(*) Notice: Subject to any disclaimer, the term of this patent is extended or adjusted under 35 U.S.C. 154(b) by 0 days.

(21) Appl. No.: 10/678,240

(22) Filed: Oct. 3, 2003

(65) Prior Publication Data

US 2004/0188077 A1 Sep. 30, 2004

Related U.S. Application Data

(60) Provisional application No. 60/415,947, filed on Oct. 3, 2002.

(51) Int. Cl.[7] .................................................. F28D 7/10
(52) U.S. Cl. ........................ 165/154; 165/90; 165/102; 165/155
(58) Field of Search ............................ 165/90, 88, 89, 165/80.4, 86, 141, 143, 154, 155, 102, DIG. 345, 159, 160; 492/46; 422/202, 205

(56) References Cited

U.S. PATENT DOCUMENTS

| 591,494 A | 10/1897 | Pond | |
| 1,900,556 A | * 3/1933 | Hitchcock | ..................... 62/118 |
| 2,261,257 A | 11/1941 | Kiesskalt et al. | ........... 241/228 |

(Continued)

FOREIGN PATENT DOCUMENTS

| DE | 299 02 348 | 4/1999 | ........... G02B/26/00 |
| DE | 299 19 570 | 1/2000 | ........... B29C/45/74 |
| EP | 0 219 357 | 4/1987 | ........... G02B/26/08 |
| EP | 0 660 336 | 6/1995 | ............ H01B/3/04 |
| GB | 891 152 | 3/1962 | |
| GB | 1 232 644 | 5/1971 | ............. B02C/1/02 |
| GB | 1 252 192 | 11/1971 | ............. H02K/5/20 |
| GB | 2 192 558 | 1/1988 | ............. B01F/3/08 |
| JP | 58 144549 | 8/1983 | ............. H02K/1/18 |
| JP | 3 279991 | 12/1991 | ............. G09F/3/02 |
| JP | 11322920 | 11/1999 | ........... C08G/65/38 |
| JP | 2000-213876 | 8/2000 | ........... B29C/47/88 |
| SU | 369 939 | 4/1973 | ..................... 241/1 |
| SU | 957 991 | 9/1982 | ................. 241/301 |
| SU | 1 737 241 | 5/1992 | ............. F27B/7/38 |
| WO | WO 97 12665 | 4/1997 | ............ B01F/5/00 |
| WO | WO 97 42639 | 11/1997 | ............ H01B/3/30 |
| WO | WO 98 49675 | 11/1998 | ............ G11B/5/09 |
| WO | WO 02 071451 | 9/2002 | |
| WO | WO 03 022415 | 3/2003 | ........... B01F/13/00 |

OTHER PUBLICATIONS

US 6,159,264, 12/2000, Holl (withdrawn)
PCT International Search Report of Dec. 28, 2004.
PCT International Search Report for PCT/US00/18038, Holl Technologies Company, completed Sep. 17, 2000, mailed Oct. 6, 2000.

(Continued)

*Primary Examiner*—Tho V Duong
(74) *Attorney, Agent, or Firm*—Greenberg Traurig LLP

(57) ABSTRACT

In apparatus for heat exchange to and from a body surface using a heat transfer liquid a heat exchanger comprises a plurality of elements within a casing connected axially against one another with spacer tube elements. Each element has its periphery spaced from the body surface to provide a flow gap for heat transfer fluid in heat exchange contact with the surface. The element have plenums separating each from one another forming connecting flow spaces for the heat transfer liquid between the heat transfer flow gap and inlet and outlet passages passing through the body. A preferred apparatus is a cylindrical rotor within a cylindrical stator with an annular processing space between them, the rotor containing a stack of heat exchange elements of the respective shape permitting high heat flux rates and uniform temperature distribution over the total rotor heat transfer surface.

9 Claims, 3 Drawing Sheets

U.S. PATENT DOCUMENTS

| | | | |
|---|---|---|---|
| 2,295,740 A | 9/1942 | Keen | 261/93 |
| 2,314,598 A | 3/1943 | Phelan | 62/114 |
| 2,474,006 A | 6/1949 | Maycock | 261/83 |
| 2,577,247 A | 12/1951 | Irwin | 99/221 |
| 2,596,622 A * | 5/1952 | Vannerus | 165/86 |
| 3,095,349 A | 6/1963 | Rich | 162/236 |
| 3,215,642 A | 11/1965 | Levy | 252/359 |
| 3,595,531 A | 7/1971 | Williams et al. | 259/7 |
| 3,841,814 A | 10/1974 | Eckhardt | 425/208 |
| 3,870,082 A | 3/1975 | Holl | 138/40 |
| 4,000,993 A | 1/1977 | Holl | 55/94 |
| 4,057,331 A | 11/1977 | Ong et al. | 350/285 |
| 4,071,225 A | 1/1978 | Holl | 366/114 |
| 4,073,567 A | 2/1978 | Lakerveld et al. | 350/6.5 |
| 4,174,907 A | 11/1979 | Suh et al. | 366/279 |
| 4,198,383 A | 4/1980 | Konsetov et al. | 422/134 |
| 4,251,576 A | 2/1981 | Osborn et al. | 428/331 |
| 4,287,075 A | 9/1981 | Fujiwara et al. | 501/135 |
| 4,306,165 A | 12/1981 | Kitabayashi et al. | 310/59 |
| 4,311,570 A | 1/1982 | Cowen et al. | 204/157.1 |
| 4,315,172 A | 2/1982 | Intichar et al. | 310/53 |
| 4,335,180 A | 6/1982 | Traut | 428/303 |
| 4,405,491 A | 9/1983 | Sando et al. | 252/359 |
| 4,556,467 A | 12/1985 | Kuhn et al. | 241/193 |
| 4,593,754 A | 6/1986 | Holl | 165/109.1 |
| 4,670,103 A | 6/1987 | Holl | 165/109.1 |
| 4,708,198 A | 11/1987 | Holl | 165/109.1 |
| 4,744,521 A | 5/1988 | Singer et al. | 241/66 |
| 4,769,131 A | 9/1988 | Noll et al. | 210/85 |
| 4,778,631 A | 10/1988 | Cobbs, Jr. et al. | 261/128 |
| 4,784,218 A | 11/1988 | Holl | 165/109.1 |
| 4,889,909 A | 12/1989 | Besecke et al. | 528/125 |
| 4,921,473 A | 5/1990 | Lee et al. | 494/27 |
| 4,930,708 A | 6/1990 | Chen | 241/65 |
| 4,983,307 A | 1/1991 | Nesathurai | 210/748 |
| 5,154,973 A | 10/1992 | Imagawa et al. | 428/325 |
| 5,198,137 A | 3/1993 | Rutz et al. | 252/62.54 |
| 5,204,416 A | 4/1993 | Mercer et al. | 525/390 |
| 5,212,278 A | 5/1993 | Pfandner | 528/171 |
| 5,227,637 A | 7/1993 | Herold et al. | 250/438 |
| 5,268,140 A | 12/1993 | Rutz et al. | 75/246 |
| 5,279,463 A | 1/1994 | Holl | 241/1 |
| 5,300,019 A | 4/1994 | Bischof et al. | 604/4 |
| 5,335,992 A | 8/1994 | Holl | 366/348 |
| 5,358,775 A | 10/1994 | Horn, III | 428/209 |
| 5,370,824 A | 12/1994 | Nagano et al. | 366/279 |
| 5,370,999 A | 12/1994 | Stuart | 435/99 |
| 5,391,603 A | 2/1995 | Wessel et al. | 524/396 |
| 5,395,914 A | 3/1995 | Wilharm et al. | 528/125 |
| 5,449,652 A | 9/1995 | Swartz et al. | 501/134 |
| 5,471,037 A | 11/1995 | Goethel et al. | 219/750 |
| 5,484,647 A | 1/1996 | Nakatani et al. | 428/209 |
| 5,506,049 A | 4/1996 | Swei et al. | 428/323 |
| 5,523,169 A | 6/1996 | Rafferty et al. | 428/551 |
| 5,538,191 A | 7/1996 | Holl | 241/1 |
| 5,552,210 A | 9/1996 | Horn, III et al. | 428/209 |
| 5,554,323 A | 9/1996 | Tsukimi et al. | 264/4.7 |
| 5,558,820 A | 9/1996 | Nagano et al. | 264/4.1 |
| 5,576,386 A | 11/1996 | Kempter et al. | 526/88 |
| 5,658,485 A | 8/1997 | Cava et al. | 252/62.9 |
| 5,658,994 A | 8/1997 | Burgoyne, Jr. et al. | 525/390 |
| 5,659,006 A | 8/1997 | White | 528/212 |
| 5,674,004 A | 10/1997 | Takeuchi | 366/69 |
| 5,693,742 A | 12/1997 | White et al. | 528/212 |
| 5,739,193 A | 4/1998 | Walpita et al. | 524/413 |
| 5,754,936 A | 5/1998 | Jansson | 419/10 |
| 5,855,865 A | 1/1999 | Lambert et al. | 424/9.52 |
| 5,873,575 A * | 2/1999 | Hanlon | 277/512 |
| 5,874,516 A | 2/1999 | Burgoyne, Jr. et al. | 528/219 |
| 5,895,598 A * | 4/1999 | Kitano et al. | 219/619 |
| 5,929,138 A | 7/1999 | Mercer et al. | 523/220 |
| 5,974,867 A | 11/1999 | Forster et al. | 73/61.41 |
| 5,998,533 A | 12/1999 | Weber et al. | 524/540 |
| 6,032,725 A * | 3/2000 | Marschke et al. | 165/90 |
| 6,039,784 A | 3/2000 | Luk | 75/231 |
| 6,040,935 A | 3/2000 | Michalicek | 359/198 |
| 6,074,472 A | 6/2000 | Jachow et al. | 106/436 |
| 6,093,636 A | 7/2000 | Carter et al. | 438/623 |
| 6,134,950 A | 10/2000 | Forster et al. | 73/54.01 |
| 6,143,052 A | 11/2000 | Kiyokawa et al. | 75/230 |
| 6,176,991 B1 | 1/2001 | Nordman | 204/601 |
| 6,190,034 B1 | 2/2001 | Nielsen et al. | 366/336 |
| 6,281,433 B1 | 8/2001 | Decker et al. | 174/35 |
| 6,391,082 B1 | 5/2002 | Holl | 75/230 |
| 6,464,936 B1 | 10/2002 | Mowat et al. | 422/22 |
| 6,471,392 B1 | 10/2002 | Holl et al. | 366/279 |
| 6,572,517 B1 * | 6/2003 | Schimion | 492/46 |
| 6,675,876 B2 * | 1/2004 | Yamashita et al. | 165/89 |
| 2001/0030295 A1 | 10/2001 | Holl | 250/492.23 |
| 2002/0038582 A1 | 4/2002 | Holl | 75/230 |
| 2002/0078793 A1 | 6/2002 | Holl | 75/230 |
| 2002/0089074 A1 | 7/2002 | Holl | 261/92 |
| 2002/0148640 A1 | 10/2002 | Holl | 174/256 |
| 2003/0043690 A1 | 3/2003 | Holl | 366/279 |
| 2003/0066624 A1 | 4/2003 | Holl | 165/47 |

OTHER PUBLICATIONS

PCT International Search Report for PCT/US01/15258, Holl Technologies Company, completed Jan. 24, 2002, mailed Feb. 1, 2002.

PCT International Search Report for PCT/US01/20635, Holl Technologies Company, completed Jan. 24, 2002, mailed Feb. 1, 2002.

PCT International Search Report for PCT/US01/23657, Holl Technologies Company, completed Apr. 25, 2002, mailed May 6, 2002.

PCT International Search Report for PCT/US02/11575, Holl Technologies Company, completed Jul. 12, 2002, mailed Aug. 6, 2002.

PCT International Search Report for PCT/US02/29093, Holl Technologies Company, completed Mar. 6, 2003, mailed Mar. 17, 2003.

PCT International Search Report for PCT/US02/31076, Holl Technologies Company, completed Dec. 11, 2002, mailed Dec. 27, 2002.

PCT International Search Report for PCT/US02/05361, Holl Technologies Company, completed May 17, 2002, mailed Jun. 5, 2002.

www.pooleplastics.com/production.html, Poole Plastics and Tooling Company, Production Capabilities; Feb. 15, 2001.

Zlotorzynski; "The Application of Microwave Radiation to Analytical and Environmental Chemistry;" Critical Reviews in Analytical Chemistry; vol. 25, No. 1; pp. 43–76; 1995.

"Microwave Heating Mechanisms;" Microwave Chemistry.

"A Basic Introduction to Microwave Chemistry;" Microwave Chemistry.

"Fast and Furious;" Microwave Chemistry.

"Microwave Heating Applied to Polymers;" Microwave Chemistry.

"Application of Microwave to Organic Chemistry;" Microwave Chemistry.

"Microwave Chemistry in Liquid Media;" Microwave Chemistry.

"Microwave Heating and Intercalation Chemistry;" Microwave Chemistry.

* cited by examiner

APPARATUS FOR TRANSFER OF HEAT ENERGY BETWEEN A BODY SURFACE AND HEAT TRANSFER FLUID

CROSS REFERENCE TO A RELATED APPLICATION

This application claims priority to U.S. Provisional Application Serial No. 60/415,947, filed Oct. 3, 2002 entitled "Internal Short Path Heat Exchanger" herein incorporated by reference in its entirety.

TECHNICAL FIELD OF THE INVENTION

The field of the invention concerns novel apparatus for transferring heat energy between a rotor surface of Couette type chemical reactors and heat transfer fluids, wherein the surface is contacted by the fluids for such transfer. Such apparatus can be referred to as a heat exchanger. More particularly, but not exclusively, the invention is concerned with new apparatus for uniformly cooling or heating at least one inside surface of a Couette type rotor shell on whose outer side heat energy is being produced or absorbed.

BACKGROUND ART

Couette type reactor apparatus consists of two cylinders mounted one inside the other for rotation relative to one another about a common axis, the cylinders providing a narrow annular processing gap between their opposed stator inner and rotor outer surfaces. The materials to be processed are fed into an annular space formed therefrom.

Such apparatus is described and shown, for example, in U.S. Pat. Ser. No. 5,279,463 (issued 18 Jan., 1994); U.S. Pat. No. 5,538,191 (issued 23 Jul. 1996), and U.S. Pat. No. 6,471,392 (issued 29 Oct., 2002), the disclosures of which are incorporated herein by reference. In another type of the apparatus described in these disclosures describe cylindrical rotor and stator that have their longitudinal axes parallel but displaced from one another to provide an annular flow passage that varies in radial dimension about the circumferences of the opposed surfaces.

Such apparatus is operable, for example, to quickly chemically react two or more materials together with high reaction rates In general, most chemical reactions are to a greater or lesser degree either endothermic or exothermic, and many are very strongly so. The achievement of the highest possible heat transfer rate, if possible higher than is strictly necessary in order to provide a margin for adjustment, is therefore desirable to ensure that the processing temperature can at all times readily be maintained within those required limits, which can constitute a very narrow range, e.g. ±1° C.

The requirement to transfer or exchange heat energy between bodies, and/or between fluids separated by a body wall, and/or between a body and a fluid, is essential in a vast number of processes and apparatus. Heat exchanger apparatus design and application is now a very mature art. Such apparatus may consist of a separate structure to which the transfer fluid is supplied and from which it is discharged, or it may be associated with and/or form part of apparatus in which the heat energy is produced or consumed. When employing liquid heat transfer fluids, temperatures will rise when cooling a surface and will drop when heating a surface. There are however many special cases, especially in chemical reaction processes, when surfaces which contain and control the reactants, are required to remove or introduce heat to the reactants very rapidly and at an as constant as possible temperature in order to avoid the production of unwanted side products or to improve reaction yields. Due to the fact that the heating or cooling liquids usually flow along the surfaces to be heated or cooled, picking up or giving up heat along their path, it is very difficult to obtain high heat flux rates through such surfaces and simultaneously maintain uniform and constant temperatures with such applications. There is therefore a constant endeavor to develop heat exchange methods which enable high heat flux rates while simultaneously maintaining uniform and constant temperatures on surfaces such as those used in chemical processing.

DISCLOSURE OF THE INVENTION

It is the principal object of the invention therefore to provide new apparatus for such transfer of heat energy between body surfaces and heat transfer fluids which facilitate such an endeavor.

In accordance with one aspect of the invention, there is also provided novel apparatus, the apparatus exterior being in contact with chemical reactants, for transferring heat energy at high flux rates and with uniform distribution of temperature to and from a body surface respectively from and to heat transfer liquid that is introduced into and removed from a space bounded by the body surface for heat transfer contact with the body surface, the apparatus comprising:

a casing providing a body surface of cylindrical transverse cross section that is to be contacted by heat transfer liquid;

a plurality of heat exchanger elements within the casing to provide between themselves and the body surface a flow gap for flow of heat transfer liquid in heat transfer contact with the body surface;

a first passage means traversing the plurality of heat exchanger elements from a first to a last heat exchanger element, from which heat transfer liquid can flow to and be distributed to the flow gap, passing through a first plurality of circular plenums;

a second passage means traversing the plurality of heat exchanger elements from the last to the first heat exchanger element to which heat transfer liquid can flow and be collected from the flow gap, after passing through a second plurality of circular plenums;

first passage means between respective heat transfer elements to their exteriors from the first plenum for flow of heat transfer liquid; and second passage means between respective heat transfer elements from their exteriors to the second plenum for flow of heat transfer liquid for flow of heat transfer liquid.

The plurality of heat exchanger elements of such apparatus are connected with one another through respective, short connector tubes and are enveloped by a common body surface for heat transfer, all of the first plenums of the elements being connected with common first passage means, and all of the second plenums of the elements being connected with common second passage means. The first and second passage means may be provided by respective cavities in the element bodies. In particular embodiments, the plurality of heat exchanger elements of such apparatus are stacked.

Another aspect of the invention provides for associated methods of use of the novel apparatus provided by the teachings of the present invention.

BRIEF DESCRIPTION OF THE DRAWINGS

Particular preferred embodiments of the invention will now be described, by way of example, with reference to the accompanying diagrammatic drawings, wherein.

LIST OF REFERENCE SIGNS FOR DRAWINGS

Figure 1:
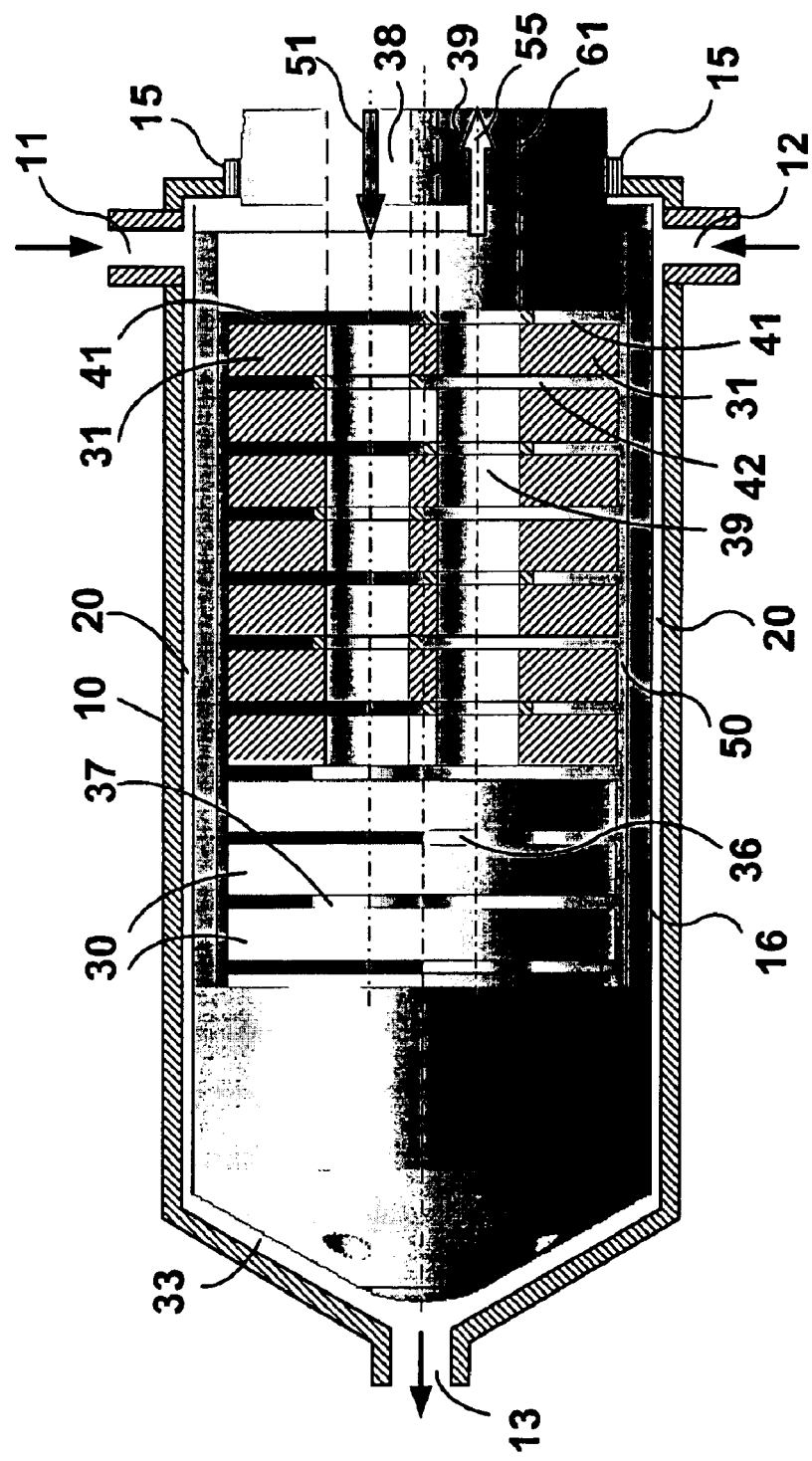
FIG. 1 is a part elevation, part longitudinal cross section, through an exemplary embodiment of heat transfer apparatus of the invention as applied to a Couette type chemical reactor, comprising an exemplary motor driven cylindrical rotor disposed within a hollow cylindrical stator, the rotor being provided with an exemplary heat exchanger in accordance with the teachings the present invention.

10 Stator tube
11 Inlet for first process or reactant fluid
12 Inlet for second process or reactant fluid
13 Outlet for processed fluid
14 Rotor shaft
15 Shaft seal
16 Cylindrical tube providing rotor body
20 Processing gap between stator and rotor
30 Individual heat exchanger elements
31 End member for one end of element stack
32 End member for other end of element stack
33 End closure member for tube 10
34 Section A—A through a heat exchanger element
35 Section B—B through a second plenum indicating flow arrows and passage means
36 First element connecting tube part
37 Second element connecting tube part
38 Axial bores forming first passage means to first plenums
39 Axial bores forming second passage means to second plenums
40 Circumferential set screws
41 First plenum
42 Second plenum
50 Annular heat transfer gap
51 Arrows indicating inlet flow of heat exchange liquid
52 Arrows indicating inlet flow heat exchange liquid through first plenums
53 Arrows indicating heat exchange liquid flow through gap 50
54 Arrows indicating heat exchange liquid exit flow through second plenums
55 Arrows indicating exit flow of heat exchange liquid
60 Inlet for heat transfer fluid
61 Outlet for heat transfer fluid

DETAILED DESCRIPTION

Similar or equivalent parts are given the same reference number in all of the figures of the drawings, wherever that is possible. The thickness of various walls and the spacing between certain surfaces are exaggerated whenever necessary for clarity of illustration.

In apparatus as exemplarily illustrated schematically in FIG. 1, the reactant materials, together with, if required, optional functional materials such as catalysts, reactant gas/es, surfactant/s, etc. are fed from respective supply tanks (not shown) via respective metering pumps or valves (not shown) to respective inlets, such as inlet 11 at one end of the apparatus in a tubular stator body 10, as known in the art.

Figure 2:
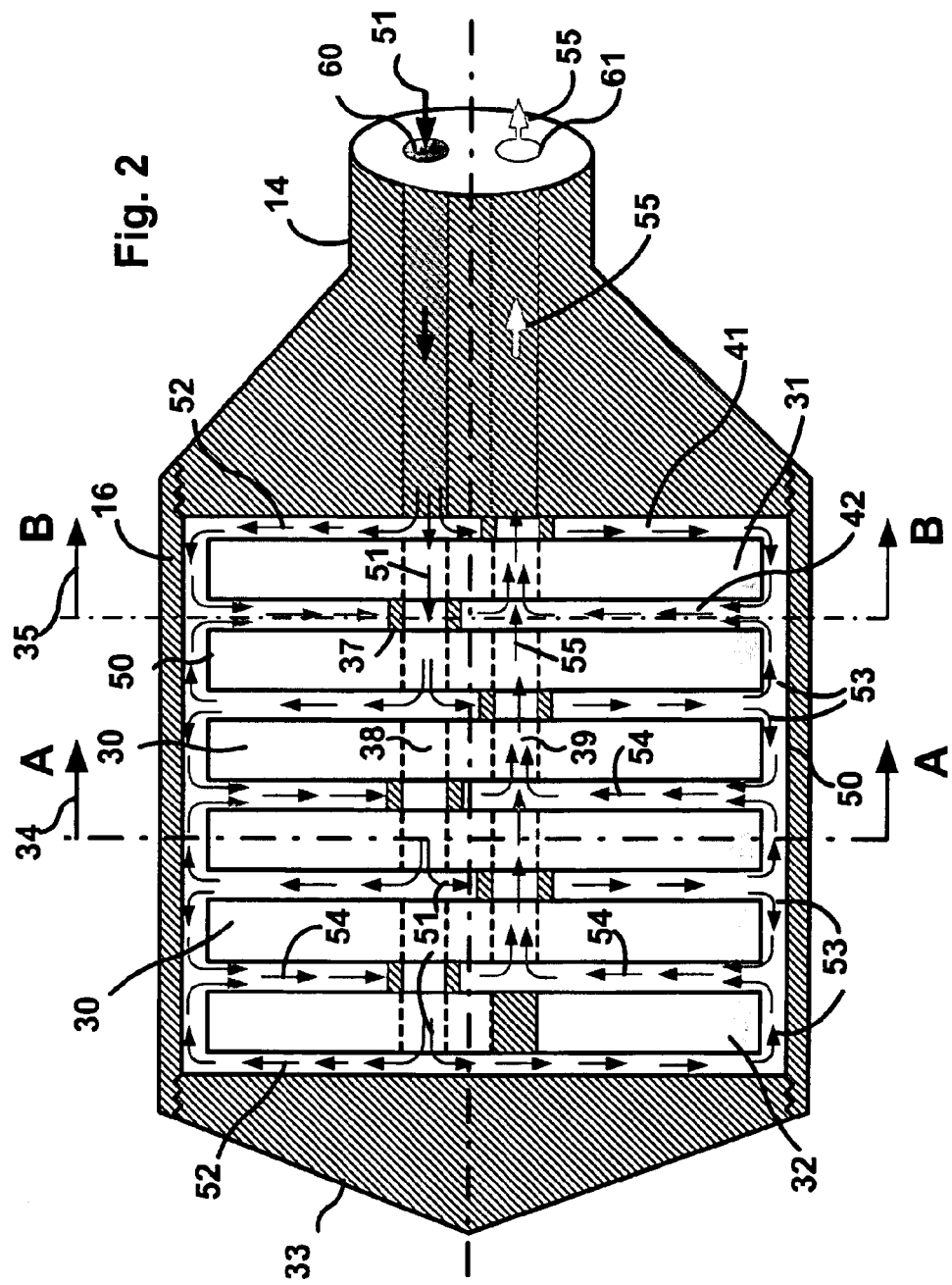
FIG. 2 is a schematic part elevation, part longitudinal cross section indicating exemplary flow paths of a heat transfer liquid through and between six exemplary heat exchanger elements connected with one another through short, tubular connector means.

For some processes the provision of heat exchange means around the outside of the stator tube 10 of a Couette type reactor may provide sufficient cooling or heating, however, particular reactions that have high reaction rates, such arrangements will not provide sufficient cooling or heating and it becomes desirable, or even essential, to provide cooling or heating of the corresponding rotor surface. In FIG. 2, a rotor shaft 14 is connected to a drive motor (not shown) by which it is rotated, usually at relatively high speeds. The processing portion of the rotor consists of a cylindrical tube 10 of uniform diameter along its length, the longitudinal axes of both the rotor body and the stator body being coincident with one another. An annular cross section processing gap 20 of uniform radial dimension around its circumference, and with a longitudinal axis coincident with the axes of the two surfaces and of the drive shaft, is formed between the inner cylindrical surface of the stator tube 10 and the outer cylindrical surface of the rotor tube 16. Material that has been processed in the processing gap 20 is discharged through an outlet 13 at the other end. For example and without limitation, a small high shear processing unit can have an exemplary rotor circumference of 40 cm (16 in), while the rotor is rotated at 2,000 revolutions per minute; the exemplary radial dimension of the processing gap 20 will usually be in the range of about 0.2 mm to about 2.5 mm, more preferably from 0.3 to 2.0 mm.

The heat to be removed or added through the rotor passes through the rotor and stator body walls, which are therefore as highly heat transmissive as possible, as by being made of heat conductive metallic material, and being as thin as possible consistent with the required structural strength, the heat conductive material can be material such as stainless steel 316, Hastalloy C (a wrought nickel-chromium-molybdenum alloy), rhodium plated carbon steel, etc. In conventional heat exchangers, heat transfer fluid enters one end of a chamber having the wall to be heated or cooled as one wall thereof and passes to the other end of the chamber where it exits, so that the path is constituted by the entire length of the chamber. Such structures are not able to provide close/tight control of the temperature of the wall, owing to the relatively considerable length of time for which any portion of the heat exchange fluid is in heat exchange contact therewith. Much tighter control is possible if the length of the path during which heat exchange takes place is short, for example about 3 cm or less, preferably about 2 cm, and more preferably about 0.5 cm, and if a sequential multitude of such short path lengths are used, considerably higher heat flux rates are possible. Such short path lengths are possible with the apparatus of the invention, even when the overall length of the surface to be cooled or heated is relatively long, for example, from about 4 cm to 200 cm or longer.

Thus, in heat exchange apparatus provided in accordance with the teachings of the invention, the use of an assembly comprising a number of individual heat exchange elements, each of which forms and provides its own short flow path length segment wherein the longitudinal dimension of each segment corresponds approximately to the longitudinal dimension of the respective element. In the embodiment illustrated by FIG. 1, the rotor heat exchanger is constituted by an assembly often heat exchanger elements 30 stacked end to end in contact with one another within the interior of the rotor tube 16 through connecting short tube elements 36 and 37. The individual heat exchanger elements 30 can be connected by the first connecting tube pan 36. The longitudinal length of the first connecting tube part 36 is less than the longitudinal length of each of the heat exchange elements 30. Alternatively, the individual heat exchanger elements 30 can be connected by the second connecting tube part 37. The longitudinal length of the second connecting tube part 37 is less than the longitudinal length of each of the heat exchange elements 30. The individual heat exchanger elements 30 can also be connected by the first connecting tube part 36 and the second connecting tube part 37. The longitudinal lengths of the first connecting tube part 36 and the second connecting tube part 37 are less than the longitudinal length of each of the heat exchange elements 30. The end of rotor tube 16 is closed by a closure member 33 which, in this example, is screw threaded to the end of the rotor tube 16. Other methods of attaching closure member 33 to the rotor tube 16 may also be utilized such as bolting closure member 33 to the end rim of the rotor tube as known to those of ordinary skill in the art.

Figure 4:
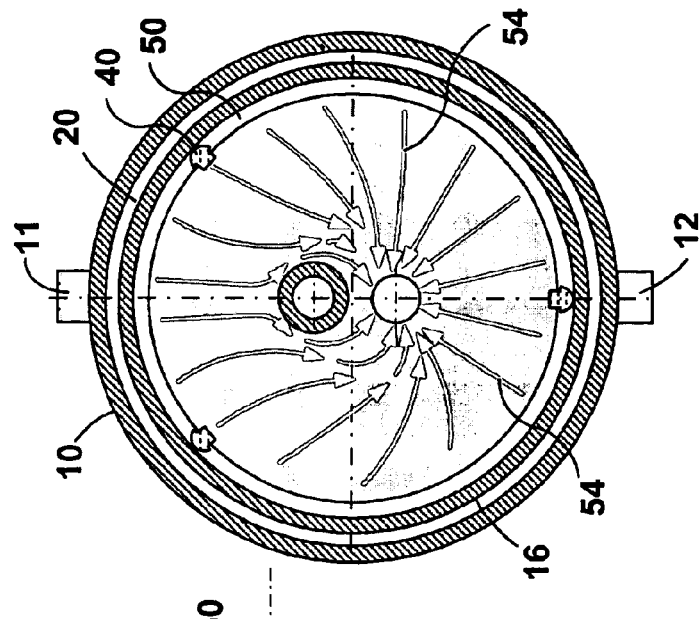
FIG. 4 is a cross section along line B—B of FIG. 2, through a second plenum, separating two heat transfer elements, indicating the direction of the flow of heat transfer liquid returning from the heat transfer gap and flowing into the circular cavity of second passage means.
Figure 3:
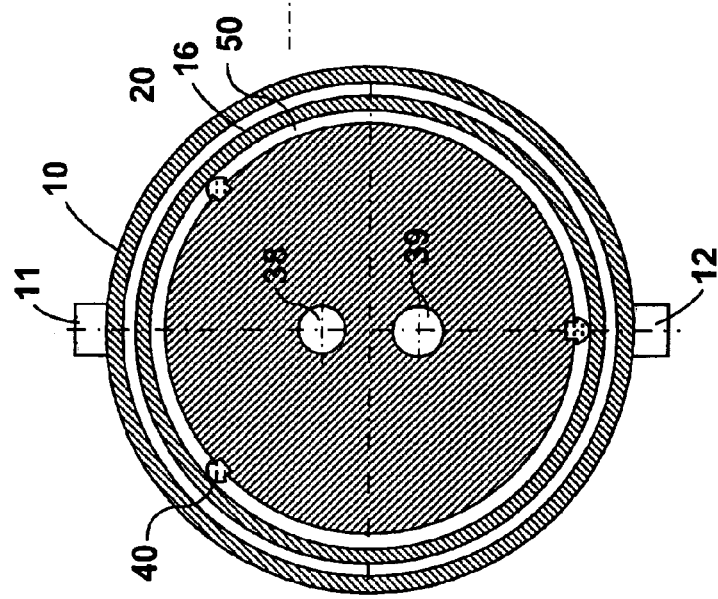
FIG. 3 is a cross section along line A—A of FIG. 2, through the body of a heat exchanger element, parallel to the element's flat faces, showing the annular heat transfer gap and the circular cavities provided for first and second passage means for the heat transfer liquid.

Referring now more particularly to FIGS. 2, 3 and 4, in this embodiment each element 30 is cylindrical and of circular transverse cross section, the elements being held against rotation relative to one another by being brazed to the faces of connecting tubes 36 and 37. In FIGS. 3 and 4, sections shown depict stator tube 10 in cross section, and inlets 11 and 12, for reference purposes. In this embodiment, each element is held in a concentric position relative to the inner surface of the rotor tube 16 through the height of the heads of three set screws 40, inserted around the periphery of the elements at equal circumferential distances. Set screws 40 are not shown in FIG. 2 for clarification in order to more clearly illustrate heat transfer fluid flow. Bores 38 and 39 of the stack of elements register with one another so as to provide corresponding uninterrupted longitudinal first flow passage means through the stack that discharge into the plenums 41 and 42 leading to annular heat transfer gap 50. Inlet and outlet passages 60 and 61, respectively, are corresponding with a suitable rotating joint in the shaft (not shown), and thence to a supply (or source) of heat transfer fluid.

As an example only, in an exemplary Couette reactor apparatus as described above, where the rotor is of 40 cm (16 ins) circumference, and therefore 12.73 cm (5.09 ins) diameter, the annular heat transfer gap 50 typically is of radial dimension from 0.2 mm to 2.0 mm.

It will be seen therefore that heat exchange apparatus of the invention provides complete flexibility of design to meet the conditions under which the accompanying apparatus is to operate. The lengths and diameters of the stator and rotor tubes are determined by the specific nature of the reaction which is to be carried out in the apparatus, and the diameter of the heat exchange elements will, as described, correspond with the interior diameter of the rotor tube and the annular heat transfer gap 50, the radial dimension of which will be adjusted to correspond with the quantity of heat exchange fluid that is required as well as that of the heat transfer film coefficient (heat flux through a boundary layer of a fluid flowing past a heat transfer surface in kW per $m^2$ and $°K$), while the longitudinal dimension of each heat exchange element and the number that are provided within the rotor tube 16, in some embodiments end to end, will be determined by the degree of control that is required for the reacting materials in the processing gap 20 between stator and rotor.

It is therefore a characteristic of the apparatus of the invention that the heat transfer fluid can be made to engage the surface involved in the heat transfer for a relatively very brief period of time, and is then immediately removed and delivered into a plenum spaced from the surface, as contrasted with most conventional apparatus in which contact is prolonged for as long as possible. It is a consequence of this very short contact period that the majority of the temperature difference produced in the heat transfer fluid between the inlet and outlet plenums takes place during this short period, giving the possibility of much more precise control of heating or cooling rates/values than is possible when the contact time with the heat exchange surface is substantial.

Although the apparatus of the invention has been shown applied to and forming an integral part of a particular machine, it is of course of general application to any situation in which heat exchange is required. Moreover, although the invention has been illustrated as applied to apparatus in which the heat exchange elements are of circular transverse cross section in order to fit within a round cylindrical tube, it is not limited in application to such shape and can equally be employed fitted into containing casings which are of non-circular cross section, such as oval, square or rectangular, and also with openings of different shapes within their periphery.

While particular exemplary embodiments have been chosen to illustrate the teachings of the invention, it will be understood by those skilled in the art that various changes and modifications can be made therein without departing from the scope of the invention.

I claim:

1. Apparatus for transferring heat energy to and from a body surface respectively from and to heat transfer fluid that is introduced into and removed from a space bounded by the body surface for heat transfer contact with the body surface, the apparatus comprising:

a body providing a body surface of cylindrical transverse cross section that is to be contacted by heat transfer fluid;

a plurality of hear exchanger elements within a casing having a shape that provides between each of said plurality of heat exchanger elements and the body surface a flow gap for flow of heat transfer fluid between the periphery of the elements and the body surface in heat transfer contact with the body surface, each of the connecting tubes, including a first set of heat exchanger elements connected by a first connecting tube and a second set of heat exchanger element connected by a second connecting tube being less than the longitudinal length of each of the heat exchanger elements;

a first plenum at one end of the flow gap from which heat transfer fluid can flow through the flow gap, or into which heat transfer fluid can flow from the flow gap;

a second plenum at the other end of the flow gap respectively into which heat transfer fluid can flow from the flow gap, or from which heat transfer fluid can flow into the flow gap.

2. The apparatus as claimed in claim 1, wherein the plurality of heat exchanger elements are within the casing which has a shape that provides between itself and the body surface a flow gap for flow of heat transfer fluid between the periphery of the plurality of elements and the body surface in heat transfer contact with the body surface, said plurality of elements having a plurality of first plenums and a plurality of second plenums, the plurality of first plenum being in communication with a common first passage means, and said second plurality of plenums of the elements being connected with a common second passage means.

3. The apparatus as claimed in claim 2, wherein the common first passage means to the plurality of first plenums is disposed adjacent the center of the element body, and the common second passage means to the second plurality of plenum is adjacent the center of the element body.

4. The apparatus as claimed in claim 1, wherein the body providing said body surface is cylindrical and of circular transverse cross section, and said plurality of heat exchanger elements have a corresponding circular cross section.

5. The apparatus as claimed in claim 4, wherein the body is a cylindrical tube containing the plurality of heat exchanger elements of cylindrical shape disposed within the body.

6. The apparatus as claimed in claim 1, wherein said flow gap for flow of heat transfer fluid between the periphery of the element and the body surface in heat transfer contact with the body surface is annular.

7. The apparatus as claimed in claim 6, wherein said flow gap is comprised of a flow path having a length of about 3 cm or less.

8. The apparatus as claimed in claim 6, wherein said flow gap is comprised of a flow path having a length of about 0.5 cm.

9. The apparatus of claim 1, wherein said flow gap of each of said plurality of heat exchanger elements have a longitudinal dimension that substantially corresponds to the longitudinal dimension of said respective heat exchanger elements.

* * * * *